C. McGEE.
CULTIVATOR.
No. 193,532.  Patented July 24, 1877.
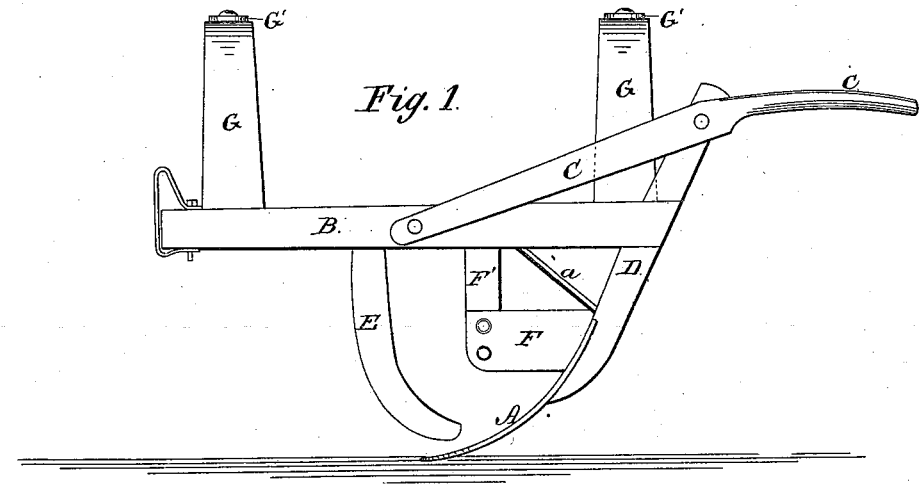
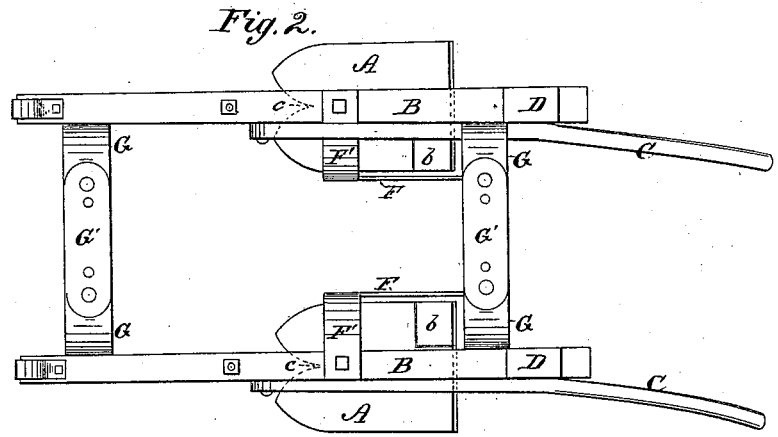

UNITED STATES PATENT OFFICE.

CHARLES McGEE, OF ELWOOD, KANSAS.

IMPROVEMENT IN CULTIVATORS.

Specification forming part of Letters Patent No. 193,532, dated July 24, 1877; application filed March 15, 1877.

*To all whom it may concern:*

Be it known that I, CHARLES McGEE, of Elwood, in the county of Doniphan and State of Kansas, have invented a new and Improved Corn-Cultivator; and I do hereby declare that the following is a full, clear, and exact description of the same, reference being had to the accompanying drawings, forming part of this specification, in which—

Figure 1 is a side view, and Fig. 2 a plan view.

My invention relates to an improved form of cultivator, designed more particularly for the cultivation of corn in the first and middle stages of its growth, but applicable to the cultivation of other plants arranged in rows.

The improvement is in that class of cultivators which are constructed in duplicate form, with shovels upon separate beams, arranged to cultivate upon both sides of a row at once, which beams are connected by a loosely-jointed elevated coupling, high enough to permit the plants to pass under the same, and coupled loosely to permit one set of shovels to be advanced or retracted independently of the other.

The improvement consists in arranging upon each beam a nicked shovel, combined with a centrally-arranged cutting-blade, as hereinafter more fully described.

In the drawings are represented the duplicate devices for the cultivation of the opposite sides of the same row. Each consists of a beam, B, handle C, and stock D, attached to beam and braced by rod $a$. To this stock is attached, by suitable bolts, the shovel A, which latter is made with a nick, $c$, in its point, which forms practically a double point, the object of which is to catch and cut off tall weeds and tough grasses, which would otherwise scrape around the shovel and be thrown against the plants. To prevent the clogging of grass in the nick of the shovel, and to render its cutting action more easy, a vertical colter or blade, E, is arranged in the beam, and made to depend centrally above the nick in the shovel. The shovels are also made with a detachable plate, $b$, upon their upper and inner sides, which may be fastened by either bolts or rivets to a re-enforcing plate beneath, so as to be either applied or removed at will. When the plants are young and tender said detachable plates are left off, so as to prevent the throwing of too much earth upon the same; but when the plants become of more vigorous growth the plates are employed to throw the dirt to them as a foundation to their newly-forming roots.

Upon each of the beams B of the cultivator is arranged an adjustable cutter, F, arranged upon the inside and between the two beams. These cutters are rigidly attached to spring-plates F', which are bent around at the top and fastened to the beam. The cutters F are by this means made automatically adjustable through the flexibility of the supporting plates, and while they serve to cut the grass close to the roots and co-operate with the shovels in removing the same, they also automatically adjust themselves to stones, clods, or other obstacles, and by passing to one side of the same prevent throwing such obstruction upon the tender plants.

The duplicate devices of the cultivator as thus described are connected by front and rear couplings, which are alike constructed of vertical bars G, attached to the beam, bent inwardly at the top, and connected by a loosely-pivoted link-bar, G'. This, it will be seen, makes an elevated connection, which permits the cultivation of the corn after it has attained a considerable growth, and also permits one of the sets of devices to be used in advance of the other, and the two sets thus brought close upon the row or farther apart, as may be desired.

The handles C of the cultivator are arranged, one upon the inside and the other upon the outside of their respective beams, and both projecting obliquely to one side, so as to permit the cultivator to straddle the row, and yet permit the driver to walk beside the row.

Having thus described my invention, what I claim as new is—

The shovel A, provided with the nick $c$, in combination with the centrally-arranged colter or blade E, as and for the purpose described.

CHARLES McGEE.

Witnesses:
ROBERT GUNN,
GEO. L. ANDERSON.